United States Patent
Johnson et al.

(10) Patent No.: US 9,600,526 B2
(45) Date of Patent: Mar. 21, 2017

(54) GENERATING AND USING TEMPORAL DATA PARTITION REVISIONS

(71) Applicant: AT&T Intellectual Property I, L.P., Atlanta, GA (US)

(72) Inventors: Theodore Johnson, New York, NY (US); Marios Hadjieleftheriou, Morristown, NJ (US); Vladislav Shkapenyuk, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 247 days.

(21) Appl. No.: 13/706,893

(22) Filed: Dec. 6, 2012

(65) Prior Publication Data
US 2014/0164409 A1    Jun. 12, 2014

(51) Int. Cl.
*G06F 17/30* (2006.01)

(52) U.S. Cl.
CPC .. *G06F 17/30501* (2013.01); *G06F 17/30377* (2013.01)

(58) Field of Classification Search
CPC .......... G06F 17/30516; G06F 11/1448; G06F 2201/835; G06F 17/30345; G06F 17/30489; G06F 17/30412; G06F 17/30584; G06F 11/1471; G06F 17/30501; G06F 17/30377; G06F 2201/08; Y10S 707/99955; H04L 47/28; H04L 47/2416; H04L 47/801; H04L 47/822; H04L 47/34; H04L 65/608; H04L 43/0829; H04L 43/0852; H04L 47/38; H04L 49/90; H04L 65/604; H04L 69/28; H04L 47/32

USPC ......................................................... 707/756
See application file for complete search history.

(56) References Cited

U.S. PATENT DOCUMENTS

| | | | | |
|---|---|---|---|---|
| 5,832,519 | A  * | 11/1998 | Bowen ..................... | G01B 5/02 |
| 6,282,175 | B1 * | 8/2001 | Steele ................. | G06F 11/0709 |
| | | | | 370/254 |
| 8,051,039 | B2 | 11/2011 | Barrett-Lennard | |
| 2005/0083358 | A1 | 4/2005 | Lapstun et al. | |

(Continued)

FOREIGN PATENT DOCUMENTS

EP    1785893    5/2007

OTHER PUBLICATIONS

Soo, Michael D., Richard T. Snodgrass, and Christian S. Jensen. "Efficient evaluation of the valid-time natural join." Data Engineering, 1994. Proceedings. 10th International Conference. IEEE, 1994.

(Continued)

*Primary Examiner* — Evan Aspinwall
(74) *Attorney, Agent, or Firm* — Hartman & Citrin LLC (57) ABSTRACT

Concepts and technologies are disclosed herein for generating and using temporal data partition revisions. In some embodiments, a server computer can execute a data management application. The server computer can obtain a data partition associated with a data stream. The data partition can include a data point and a timestamp. The server computer can analyze the timestamp to determine if the data partition corresponds to an update of a base data record. If the server computer determines that the data corresponds to an update, the server computer can compute a revision comprising a delta and a timestamp and store the revision.

19 Claims, 6 Drawing Sheets

(56) References Cited

U.S. PATENT DOCUMENTS

2007/0291654 A1* 12/2007 Pepper ................... H04L 43/08
                                                                370/252
2013/0173530 A1*  7/2013 Laron ............... G06F 17/30165
                                                                707/608

OTHER PUBLICATIONS

Golab, Lukasz et al., "Consistency in a Stream Warehouse," <http://www.research.att.com/export/sites/att_labs/techdocs/TD_100239.pdf> Conference on Innovative Data Systems Research (CIDR'11). 2011.

Johnson, Theodore etl al., "Bistro Data Feed Management System." <http://www.research.att.com/export/sites/att_labs/techdocs/TD_100454.pdf>, (2011).

Missmiis "How to Make SQL Delta Tables," <http://www.wapshere.com/missmiis/how-to-make-a-sql-delta-table>, May 28, 2007.

IBM Tivoli Directory Integrator, Version 6.1, "Deltas" <http://pic.dhe.ibm.com/infocenter/tivihelp/v2r1/index.jsp?topic=%2Fcom.ibm.IBMDI.doc_6.1%2Fusersguide23.htm>, Copyright 2006.

* cited by examiner

GENERATING AND USING TEMPORAL DATA PARTITION REVISIONS

BACKGROUND

This application relates generally to data management. More specifically, the disclosure provided herein relates to managing data by generating and using temporal data partition revisions.

Some communications networks provide various data collection and/or analysis functions. These data collection and/or analysis functions may be performed by collecting data relating to network traffic, device or system utilization information, user statistics, device usage statistics, packet inspection functions, or the like. Because modern communication networks have grown exponentially over the past several years, the amount of data collected and analyzed, as well as the frequency with which data is collected and/or analyzed has increased. Thus, collected and/or analyzed data may be updated at any time.

In some instances, the delivery of updates to a data collection and/or analysis system may be delayed. Such delays may result from network unavailability, congestion, or the like, processing errors and/or delays, and/or as a result of other causes. Thus, updates to stored data may be received. Applying the updates to the data may result in suspending data analysis operations and/or may otherwise cause additional delays and/or unwanted load on the data collection and/or analysis systems. Furthermore, because of the increased speed and/or frequency of data reporting, collection, and analysis, some updates may be received as a stream of data that may arrive several times a second, minute, hour, or day.

Because data collection and/or analysis systems may also respond to requests such as queries, failure to apply the updates in a timely manner may adversely affect results of the executed requests. Furthermore, as noted above, application of the updates may interrupt responding to the requests and/or other data collection and/or analysis operations of various systems. Because of these and other concerns, some data collection and/or analysis systems may apply updates when received, resulting in poor performance and/or delays for users.

SUMMARY

The present disclosure is directed to generating and using temporal data partition revisions. A server computer can execute a data management application for managing storage and updating of temporal data partitions. The server computer can obtain data associated with a data stream generated by a data source. The data stream can include network statistics such as traffic, network and/or resource utilization and/or availability information, deep packet inspection information, combinations thereof, or the like. The data obtained by the server computer also can include one or more records. One or more of the records can include a data point and a timestamp indicating a time at which the data point was collected and/or released by the data source.

In some embodiments, the data sources generate a key or other identifier and can include the key or identifier in the data records. In some other embodiments, the server computer can generate the key or other identifier for one or more of the records and store the records as base data in a data store with the key or other identifier. When future data releases are made by the data sources, the server computer can determine if the records correspond to updates of existing records and/or to new records to be stored as the base data. The determination can be based upon contents of the records and therefore can be based upon the data points, header information, source information, timestamps, keys or other identifiers, and/or other information. If the server computer determines that the data is an update, the server computer can store the updates as revisions that can include a delta defining a difference between the data included in the revision and the data included in a partition or table including the revision updates, a timestamp, and/or a key or other identifier.

The server computer also can be configured to respond to queries of the base data. The server computer can execute queries against the base data, generate a result set, and determine if one or more revisions relating to records identified in the query of the base data are stored as the revision data. If one or more revisions are stored, the server computer can retrieve the data satisfying the query and apply the one or more revisions to the data to generate the updated results that can be returned to the requestor. The server computer also can be configured to merge partitions with revisions periodically and/or on-demand to compute a new or revised value of the partition. The server computer can obtain one or more revisions, merge the revisions to generate a merged revision, and apply the merged revision to a base data table or partition with which the revisions are associated to generate an updated partition or table. The server computer can store the updated partition as the base data and delete the old base data partition and/or the applied revisions.

According to one aspect of the concepts and technologies disclosed herein, a method is disclosed. The method can include obtaining, at a server computer executing a data management application, a data partition associated with a data stream. The data partition can include records, which include a data point and a timestamp. The method also can include analyzing, by the server computer, the timestamp to determine if the data partition corresponds to an update of a base data partition. In response to a determination that the data partition corresponds to the update, the method can include computing, by the server computer, a revision including a delta and the timestamp, and storing the revision.

In some embodiments, computing the revision can include generating an identifier and including the identifier in the revision. The base data table or partition ("base data partition") can include a base data identifier, and the identifier and the base data identifier can be the same. In some embodiments, the data can include an identifier, the base data partition can include a base data identifier, and determining that the data corresponds to the update can include determining that the identifier is the same as the base data identifier. The method also can include receiving a query, executing the query against the base data, and storing a result set including results of the query against the base data. The result set can include the base data.

In some embodiments, the method further can include determining if a base data revision is stored. In response to a determination that the base data revision is stored, the method can include retrieving the base data revision. The method also can include applying the base data revision to the base data partition to generate an updated base data partition, and outputting a result including the updated base data partition. In some embodiments, the method also can include retrieving two revisions including updates to the base data partition, merging the two revisions to generate a merged revision, applying the merged revision to the base data partition to generate an updated base data partition, and saving the updated base data partition as the base data. Retrieving two revisions can include identifying a record including an identifier, and each of the two revisions can include a revision identifier that is the same as the identifier. In some embodiments, each of the two revisions can include a respective delta and a respective timestamp, generating the updated base data partition can include merging each respective delta to generate a merged delta, determining a most recent timestamp, and generating the merged revision, and the merged revision can include the merged delta and the most recent timestamp.

According to another aspect of the concepts and technologies disclosed herein, a system is disclosed. The system can include a processor and a memory that stores computer-executable instructions. When the computer-executable instructions are executed by the processor the processor can perform operations including obtaining a data partition associated with a data stream, the data partition including a timestamp, and analyzing the timestamp to determine if the data corresponds to an update of a base data partition. In response to a determination that the data partition corresponds to the update, the processor can compute a revision including a delta and the timestamp, and store the revision.

In some embodiments, the system further can include a data store that stores base data and revision data, and the revision can be stored as the revision data. In some embodiments, execution of the computer-executable instructions by the processor can cause the processor to perform operations further including receiving a query, executing the query against the base data, and storing a result set including results of the query against the base data. The result set can include the base data. In some embodiments, execution of the computer-executable instructions by the processor can cause the processor to perform operations further including determining if a base data revision is stored, in response to a determination that the base data revision is stored, retrieving the base data revision, applying the base data revision to the base data to generate an updated base data partition, and outputting a result including the updated base data partition. In some embodiments, execution of the computer-executable instructions by the processor can cause the processor to perform operations further including retrieving two revisions including updates to the base data partition, merging the two revisions to generate a merged revision, applying the merged revision to the base data partition to generate an updated base data partition, and saving the updated based data partition as the base data.

According to yet another aspect, a computer storage medium is disclosed. The computer storage medium can have computer-executable instructions stored thereon. The computer-executable instructions, when executed by a processor, can cause the processor to perform operations including obtaining a data partition associated with a data stream, the data partition including a data point and a timestamp, and analyzing the timestamp to determine if the data partition corresponds to an update of a base data partition. In response to a determination that the data corresponds to the update, the processor can compute a revision including a delta and the timestamp, and store the revision.

In some embodiments, the computer-executable instructions, when executed by the processor, can cause the processor to perform operations further including retrieving two revisions including updates to the base data partition, merging the two revisions to generate a merged revision, applying the merged revision to the base data partition to generate an updated base data partition, and saving the updated base data partition as the base data. In some embodiments, the computer-executable instructions, when executed by the processor, can cause the processor to perform operations further including receiving a query, executing the query against the base data, and storing a result set including results of the query against the base data. The result set can include the base data. In some embodiments, the computer-executable instructions, when executed by the processor, can cause the processor to perform operations further including determining if a base data revision is stored. In response to a determination that the base data revision is stored, the processor can retrieve the base data revision, apply the base data revision to the base data partition to generate an updated base data partition, and output a result including the updated base data partition. The data record can be obtained from a data stream generated by a data source, and obtaining the data record can include receiving the data in a temporal release of the data by the data source.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to generating and using temporal data partition revisions. A server computer can execute a data management application for managing storage and updating of temporal data partitions. The server computer can obtain data associated with a data stream generated by a data source. The data obtained by the server computer can include one or more records. The data obtained by the server computer, and the one or more of the records, can include a data point and a timestamp indicating a time at which the data point was collected and/or released by the data source. The data also can include a key or identifier, or the server computer can be configured to generate a key or other identifier for the data and/or one or more records included in the data.

When data releases are made by the data sources, the server computer can obtain data associated with the data releases and determine if the data releases correspond to an update of an existing data partition and/or to a new data partition. The determination can be based, in some embodiments, upon contents of the data, data point values, header information, source information, timestamps, keys or identifiers, other information, combinations thereof, or the like. If the server computer determines that the data is an update, the server computer can store the update as a revision that can include one or more of a delta defining a difference between a data point included in the revision and a data point included in an existing data partition, a timestamp reflecting a time at which the revision was generated or received, a key or other identifier, and/or other information.

The server computer also can be configured to respond to queries. The server computer can execute queries against the base data, generate a result set, and determine if one or more revisions relating to data identified in the query of the base data are stored as the revision data. If no revisions are stored, the server computer can respond to the queries with the result set. If one or more revisions are stored, the server computer can retrieve the one or more revisions and apply the one or more revisions to the base data to update the results. The updated results can be returned to the requestor. The server computer also can be configured to merge revisions periodically and/or on-demand with a data partition. In particular, the server computer can obtain one or more revisions, merge the revisions to generate a merged revision, and apply the merged revision to a data partition associated with the revisions to generate an updated data partition. The server computer can store the updated data partition as the base data and delete the old data partition and/or the revisions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
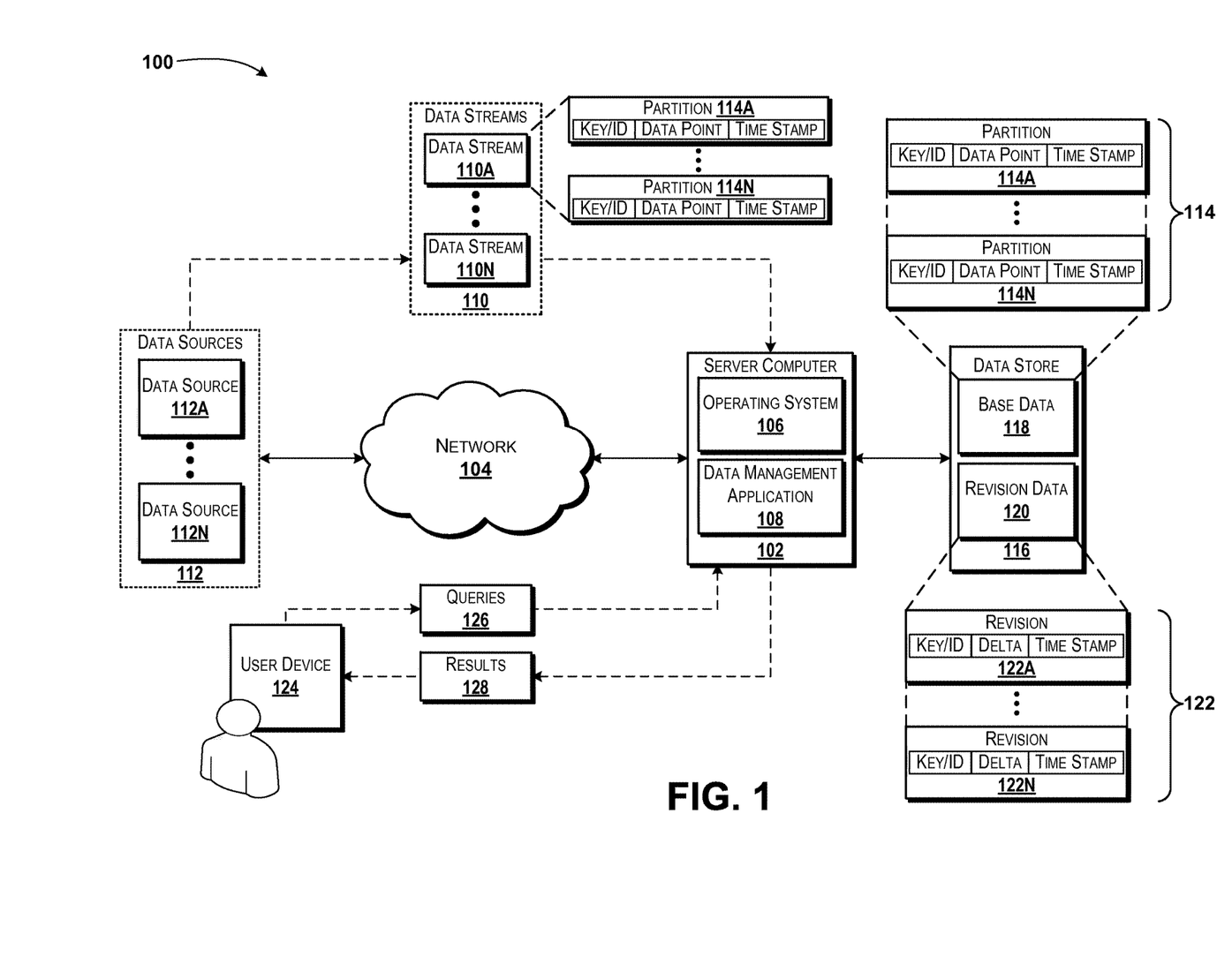
FIG. 1 is a system diagram illustrating an illustrative operating environment for the various embodiments disclosed herein.

Referring now to FIG. 1, aspects of an operating environment 100 for various embodiments of the concepts and technologies disclosed herein for generating and using temporal data partitions will be described, according to an illustrative embodiment. The operating environment 100 shown in FIG. 1 includes a computing device such as a server computer ("server computer") 102 operating in communication with and/or as part of a communications network ("network") 104.

While referred to as a "server computer" herein, it should be understood that in various embodiments of the concepts and technologies disclosed herein, the functionality of the server computer 102 may be provided by other computing systems such as, for example, desktop computers, laptop computers, other computing systems, combinations thereof, or the like. Similarly, it should be understood that the functionality of the server computer 102 can be provided by a single device as shown in FIG. 1 and/or by two similar and/or dissimilar devices. For purposes of describing the concepts and technologies disclosed herein, the server computer 102 is described herein as a single device such as, for example, a web server or a conventional server computer. It should be understood that the described embodiments are illustrative, and should not be construed as being limiting in any way.

The server computer 102 can execute an operating system 106 and one or more application programs such as, for example, a data management application 108 and/or other application programs (not illustrated). The operating system 106 can include a computer program for controlling the operation of the server computer 102. The data management application 108 can include an executable program configured to execute on top of the operating system 106 to provide the functionality described herein for generating and using temporal data revisions.

The data management application 108 can be configured to obtain and manage storage of data associated with one or more streams of data ("data streams") 110A-N (hereinafter collectively and/or generically referred to as "data streams 110"). The data streams 110 can be received or otherwise obtained from one or more data sources 112A-N (hereinafter collectively and/or generically referred to as "data sources 112"). According to various embodiments, the data sources 112 can correspond to one or more real or virtual data storage devices, server computers, network reporting devices or systems, network analytics devices, traffic monitors, deep packet inspection ("DPI") devices or systems, combinations thereof, or the like. As such, the data streams 110 can correspond to various types of streaming data including, but not limited to, network statistics, stored data, media streams, packet inspection information, user information, traffic information, device output information, analytics, performance statistics, device utilization and/or availability information, combinations thereof, or the like. Because the data sources 112 and/or their respective data streams 110 can include almost any type of sources and/or data, it should be understood that these embodiments are illustrative, and should not be construed as being limiting in any way.

As shown in FIG. 1, the data streams 110 can include one or more temporal data table partitions 114A-N (hereinafter collectively and/or generically referred to as "partitions 114"), though this is not necessarily the case. According to various embodiments, as will be explained in more detail below, each revision included in revision data stored by the data management application 108 can be associated with a specific partition included in the partitions 114. It should be understood that this embodiment is illustrative, and should not be construed as being limiting in any way.

One or more of the data streams 110 and/or partitions 114 thereof can include a data value or data point ("data point"). The data point can include an integer value, a string, and/or other types of data such as Boolean values, functions, combinations thereof, or the like. The data streams 110, and/or one or more partitions 114 thereof, also can include a time value, function, or other time-based indicator ("timestamp"). The timestamp can represent, according to various embodiments, a time at which the data point is generated and/or collected. As such, it should be appreciated that the data stream 110 and/or one or more of the partitions 114 therefore can correspond to and/or include a temporal data partition or other temporal release of data associated with the data stream 110 and/or the data source 112.

According to various embodiments, the data stream 110 and/or the partitions 114 can include records. The records of the data stream 110 and/or the partition 114 can include a key or identifier ("ID") such as a globally unique identifier ("GUID"), a string, an integer value, and/or other identifying text. While the key or identifier is illustrated in FIG. 1 as being included with the records of the partitions 114 (shown as "key/ID"), it should be understood that the key or identifier may be generated by the data management application 108, in some embodiments, and may be added to records in the partition 114 when the data associated with the data streams 110 is stored by the data management application 108 at a data storage location. As such, it should be understood that the key/ID shown with respect to the records of the partitions 114 in FIG. 1 may be omitted and/or may not be included in the records of the partitions 114 when the records are part of the data streams 110.

The data management application 108 can be configured to obtain the partitions 114 and/or other data associated with the data streams 110, and to store the data associated with the data streams 110 (e.g., the partitions 114) and/or generate instructions for storing the partition 114 in a data storage device such as, for example, the data store 116. The functionality of the data store 116 can be provided by one or more databases, server computers, hard disk drives, memory devices, desktop computers, laptop computers, other computing devices, other data storage devices, combinations thereof, or the like. According to various embodiments, the data store 116 can include a real or virtual data storage device and/or a collection or array of data storage devices. In one contemplated embodiment, for example, the functionality of the data store 116 is provided by an array of server computers located in a geographically isolated and/or geographically distributed server farm or data warehouse. Thus, components or elements of the data store 116 (not illustrated in FIG. 1) can be configured to communicate with one another via communication links. For purposes of illustrating the concepts and technologies disclosed herein, the functionality of the data store 116 is described herein as being provided by a server computer hosting a database. In view of the above-described contemplated embodiments, it should be understood that this embodiment is illustrative, and should not be construed as being limiting in any way.

The data management application 108 can be configured to obtain the data associated with the data stream 110, (e.g., the partitions 114), to generate a key or other identifier ("key/ID") for one or more records included in the partitions 114 in some embodiments, and/or to store the data at the data store 116 as tables, partitions 114, and/or other types of data or data structures. In the illustrated embodiment, the data management application 108 can be configured to store the data associated with the data stream 110 with keys or other identifiers in a data table or data partition such as a temporal base data table partition (hereinafter referred to as "base data") 118. Thus, the base data 118 can correspond, in some embodiments, to a temporal data partition. In some embodiments, the base data 118 can include a temporal data table that includes partitions 114 associated with a temporal release of data associated with the data stream 110, though this is not necessarily the case. The base data 118 can include one or more data tables, records, temporal partitions of data tables, result sets, and/or other records and/or collections of records. Therefore, it should be understood that that the illustrated example of FIG. 1 is illustrative, and should not be construed as being limiting in any way.

It can be appreciated from the illustrated operating environment 100 shown in FIG. 1 that multiple temporal releases associated with a data stream 110 can be received at the server computer 102 and stored as partitions 114 in a table or other data structure as the base data 118. According to various embodiments, the server computer 102 may receive additional temporal releases of data associated with a particular data stream 110 at various times after storing a particular temporal release of data associated with the data stream 110. At any time after storing the temporal release of the data associated with the data stream 110 as the base data 118, the server computer 102 may receive data or other data structures (e.g., additional temporal releases of the partitions 114) that can be associated with the temporal release of data previously stored as the partitions 114 in the base data 118. This additional release can correspond to an update of the data previously stored as the base data 118, as will be explained in more detail below.

To store the newly received temporal release of the data associated with the data stream 110, the server computer 102 may be limited to several options that may pose computational and/or performance challenges. In particular, the server computer 102 can store the newly received data in a memory or other structure, and update the base data 118 to incorporate the newly received data. Such update operations can consume valuable processing resources of the server computer 102. Furthermore, these operations may be executed frequently, as multiple and/or frequent updates to the base data 118 may be received after storing the base data 118 for various reasons.

Some embodiments of the concepts and technologies disclosed herein support storing the newly received data as revision data 120 at the data store 116. The newly received data can be stored by the data management application 108 as revisions 122A-N (hereinafter collectively and/or generically referred to as "revisions 122"). The revisions 122 can be structurally similar to the partitions 114 of the base data 118, though this is not necessarily the case. In particular, the revisions 122 can be received by the server computer 102 as data table updates, table partition updates, and/or even partitions 114 that may be associated with one or more records of a data table. The data management application 108 can determine that the newly received data is associated with the base data 118. This determination can be made by the data management application 108 by examining a key or other identifier included in the newly received data (if included), by comparing the newly received data to one or more partitions 114 included in the base data 118, by examining timestamps associated with the newly received data and/or the base data 118, in other ways, combinations thereof, or the like.

If the data management application 108 determines that newly received data corresponds to an update for the base data 118, the data management application 108 can generate a key or other identifier for the newly received data (if not already included), and store the newly received data as revisions 122. The revisions 122 can include a changed or modified value ("delta") that defines a change made to a data point included in the base data 118. Thus, the revision 122 can include a key or other identifier that can be used to identify a base data partition or table (partition), a delta that defines a difference or other change made to the base data partition, and a timestamp that indicates a time at which the revision 122 was created or received. Because the revisions 122 can include additional and/or alternative information, it should be understood that this embodiment is illustrative, and should not be construed as being limiting in any way.

The data management application 108 also can be configured to merge revisions 122 with the base data 118 at various times and/or upon occurrence of various trigger conditions. In particular, the data management application 108 can be configured to accumulate the revisions 122 in the data store 116. Upon receiving a trigger to merge the revisions 122, the data management application 108 can merge the revisions 122, apply the merged revisions 122 to the base data 118 to generate an updated base data table or partition, and store the updated base data table or partition at the data store 116 as the base data 118. A trigger can include, for example, a command to merge revisions 122, expiration of a timer, detecting that a last merge operation was conducted at a time that exceeds a particular threshold value, detecting that a particular number of actions have occurred at the data store 116 and/or the data management application 108, other triggers, or the like.

In merging the revisions 122, the data management application 108 can identify a particular revision 122 based upon a key or other identifier associated with the revision 122 and/or by otherwise selecting a revision 122. The data management application 108 can identify one or more related revisions 122, which can collectively represent a number of updates to the base data 118. The data management application 108 can merge the revisions 122 to generate a merged revision 122, and apply the merged revision 122 to the base data 118. Thus, the value of the base data 118 can be updated to reflect the deltas of the merged revisions 122, and the timestamp of the base data 118 can be updated to reflect the most recent timestamp of the merged revisions 122. The updated base data 118 can be saved at the data store 116 as the base data 118, thereby updating the base data 118 only once, while multiple revisions 122 have been received. Prior to merging and/or applying revisions 122 to the base data 118, however, the server computer 102 may receive requests for actions relating to the base data 118. The handling of these requests is described in additional detail below.

In particular, the server computer 102 can be configured to communicate with one or more computing devices such as, for example, the user device 124 shown in FIG. 1 to satisfy one or more requests. According to various embodiments, for example, the user device 124 can generate one or more queries 126 relating to the base data 118 and can transmit or submit the queries 126 to the server computer 102 for execution against the data in in the data store 116. The server computer 102 can execute the queries 126 against the data store 116 and provide results 128 to the user device 124.

During execution of the queries 126 against the base data 118, the data management application 108 can generate a result set during execution of the query 126 against the base data 118. The data management application 108 can store the result set in a data storage location such as a memory, cache, hard drive, or the like. The data management application 108 also can be configured to determine if one or more revisions 122 stored at the data store 116 is/are relevant to the base data 118 identified as satisfying the query 126 executed against the base data 118. Thus, the data management application 108 can be configured to execute the query 126 and obtain results, and to determine if any of the results has/have been updated between a time at which the base data 118 was stored and a time at which the query 126 was executed.

If the data management application 108 identifies one or more revisions 122, the data management application 108 can retrieve the one or more revisions 122, apply the revisions 122 to the base data 118, and generate results 128 for returning to a requestor such as the user device 124. Thus, the data management application 108 can be configured to store updates to the base data 118 and to generate results 128 that incorporate the updates even if the updates have not yet been applied to the base data 118. Thus, some embodiments of the concepts and technologies disclosed herein can be used to improve utilization of the server computer 102, prevent frequent updates to the base data 118, and/or otherwise reduce utilization and/or bandwidth consumption associated with maintaining frequently updated data, while providing requestors with up-to-date results 128 that reflect frequent updates. Additional aspects of these and other functions of the data management application 108 are set forth below in additional detail.

FIG. 1 illustrates one server computer 102, one network 104, two data sources 112, and one data store 116. It should be understood, however, that various implementations of the operating environment 100 include multiple server computers 102; multiple networks 104; less than two, two, and/or more than two data sources 112; and/or multiple data stores 116. As such, the illustrated embodiment should be understood as being illustrative, and should not be construed as being limiting in any way.

Figure 2:
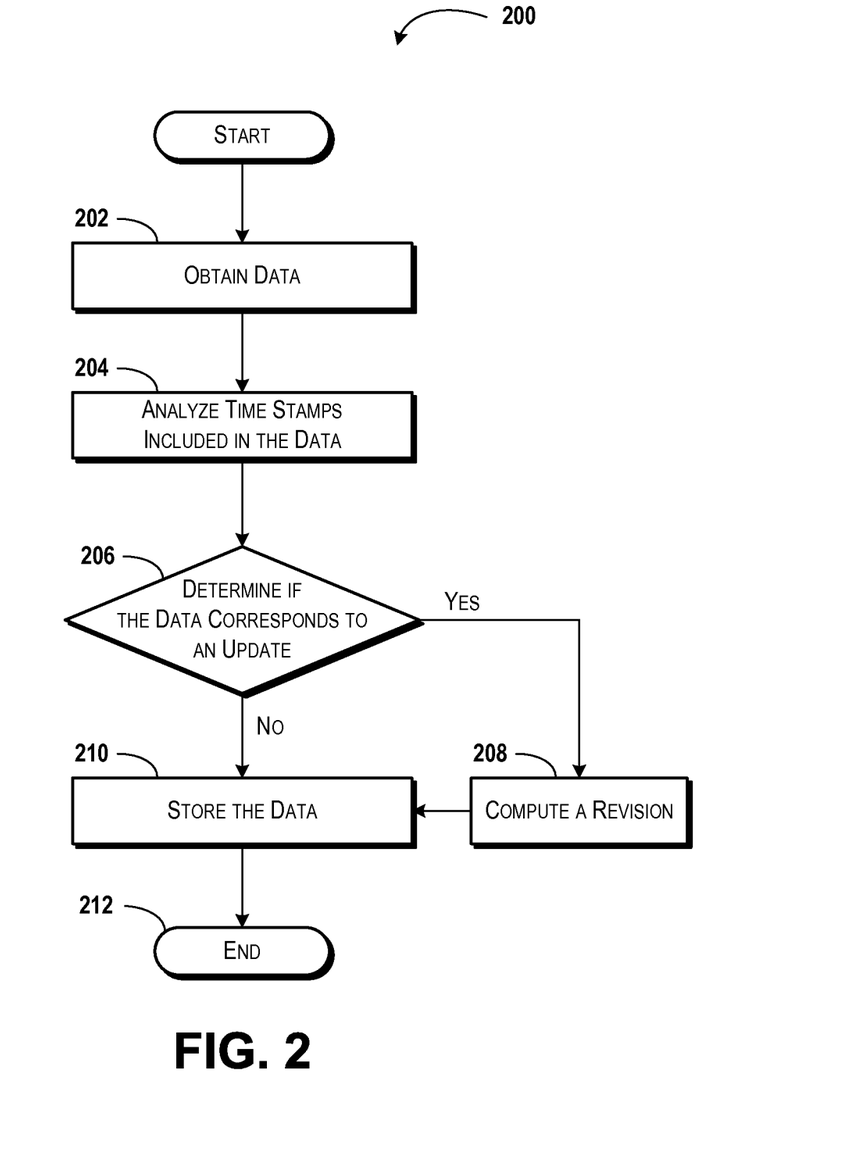
FIG. 2 is a flow diagram showing aspects of a method for storing data partition revisions, according to an illustrative embodiment.

Turning now to FIG. 2, aspects of a method 200 for storing data partition revisions will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the data management application 108. It should be understood that additional and/or alternative devices and/or network nodes can provide the functionality described herein via execution of one or more modules, applications, and/or other software including, but not limited to, the data management application 108. Thus, the illustrated embodiments are illustrative, and should not be viewed as being limiting in any way.

The method 200 begins at operation 202, wherein the server computer 102 obtains data. According to various embodiments, the server computer 102 can obtain the data by receiving, retrieving, and/or otherwise obtaining data associated with a data stream 110. According to various embodiments, the data sources 112 can stream the data streams 110 to the server computer 102. Thus, the data obtained in operation 202 can correspond to a single temporal release of one or more of the data streams 110, though this is not necessarily the case. According to embodiments of the concepts and technologies disclosed herein, the data obtained in operation 202 can include a table of records and/or data points that includes temporal data. Thus, the data obtained in operation 202 can correspond to a temporal data partition. It should be understood that this embodiment is illustrative, and should not be construed as being limiting in any way.

From operation 202, the method 200 proceeds to operation 204, wherein the server computer 102 analyzes a time stamp included in the data obtained in operation 202. As explained above, the data obtained at the server computer 102 can include a time stamp and a data point. In some embodiments, respective time stamps of the data can be the same as time stamps of data included in a base data table or partition stored as the base data 118 at the data store 116. Thus, the server computer 102 can analyze the time stamps of data obtained in operation 202 to determine if the data obtained in operation 202 corresponds to new data or to updates of the base data 118.

From operation 204, the method 200 proceeds to operation 206, wherein the server computer 102 determines if the data obtained in operation 202 corresponds to an update. Thus, the server computer 102 can determine, in operation 206, if the data obtained in operation 202 corresponds to a new temporal data partition or an update to an existing temporal data partition. In particular, the server computer 102 can analyze one or more time stamps of data obtained in operation 202 to determine if the data obtained in operation 202 corresponds to a new temporal data partition by determining that one or more time stamps included in the data obtained in operation 202 is or are not included in the base data 118.

Similarly, the server computer 102 can analyze the time stamps of data obtained in operation 202 to determine if the data obtained in operation 202 corresponds to an update to an existing temporal data partition by determining that one or more time stamps included in the data obtained in operation 202 are included in the base data 118. Because the server computer 102 can determine that the data obtained in operation 202 corresponds to an update or a new temporal data partition in additional and/or alternative ways, it should be understood that these embodiments are illustrative, and should not be construed as being limiting in any way.

If the server computer 102 determines, in operation 206, that the data obtained in operation 202 corresponds to an update for an existing temporal data partition, the method 200 proceeds to operation 208. In operation 208, the server computer 102 can compute a revision 122. The revision 122 can include a delta and a time stamp. As explained above, the delta of the revision 122 can define a difference between a data point, time value, or other value of the base data 118 and a data point, time value, or other value included in the data obtained in operation 202. Although not explicitly illustrated in FIG. 2, it should be understood that the server computer 102 can compute a revision 122 for each update included in the data obtained in operation 202. As such, the functionality of operation 208 can be repeated by the server computer 102 until revisions for each update are computed by the server computer 102.

From operation 208, the method 200 proceeds to operation 210. The method 200 also can proceed to operation 210 from operation 206, if the server computer 102 determines that the data obtained in operation 202 corresponds to a new temporal data partition. In operation 210, the server computer 102 can store the data obtained in operation 202. Thus, the server computer 102 can store the data obtained in operation 202 as the base data 118 and/or the revision data 120. Because the data obtained in operation 202 can include new temporal data partition releases and updates to existing temporal data partitions, it should be understood that the server computer 102 can store, in operation 210, one or more instances of base data 118 and/or one or more revisions 122.

From operation 210, the method 200 proceeds to operation 212. The method 200 ends at operation 212.

It can be appreciated that by executing the method 200 described above, some embodiments of the server computer 102 can be configured to identify updates to the base data 118 in data received at the server computer 102. Instead of using the updates to recompute and/or store the base data 118, the server computer 102 can be configured to compute a revision 122 corresponding to the update and to store the revision 122 at the data store 116 as revision data 120. Thus, some embodiments of the concepts and technologies disclosed herein can be used to improve utilization of the server computer 102 by preventing frequent updates to the base data 118 and/or otherwise reducing utilization and/or bandwidth consumption associated with maintaining frequently updated data such as the base data 118 described herein as including temporal data partitions associated with a data stream 110. As will be explained with reference to FIG. 3 below, however, some embodiments of the server computer 102 can provide results 128 that reflect the updates received by the server computer 102 by applying revisions 122 to result sets generated by querying the base data 118.

Figure 3:
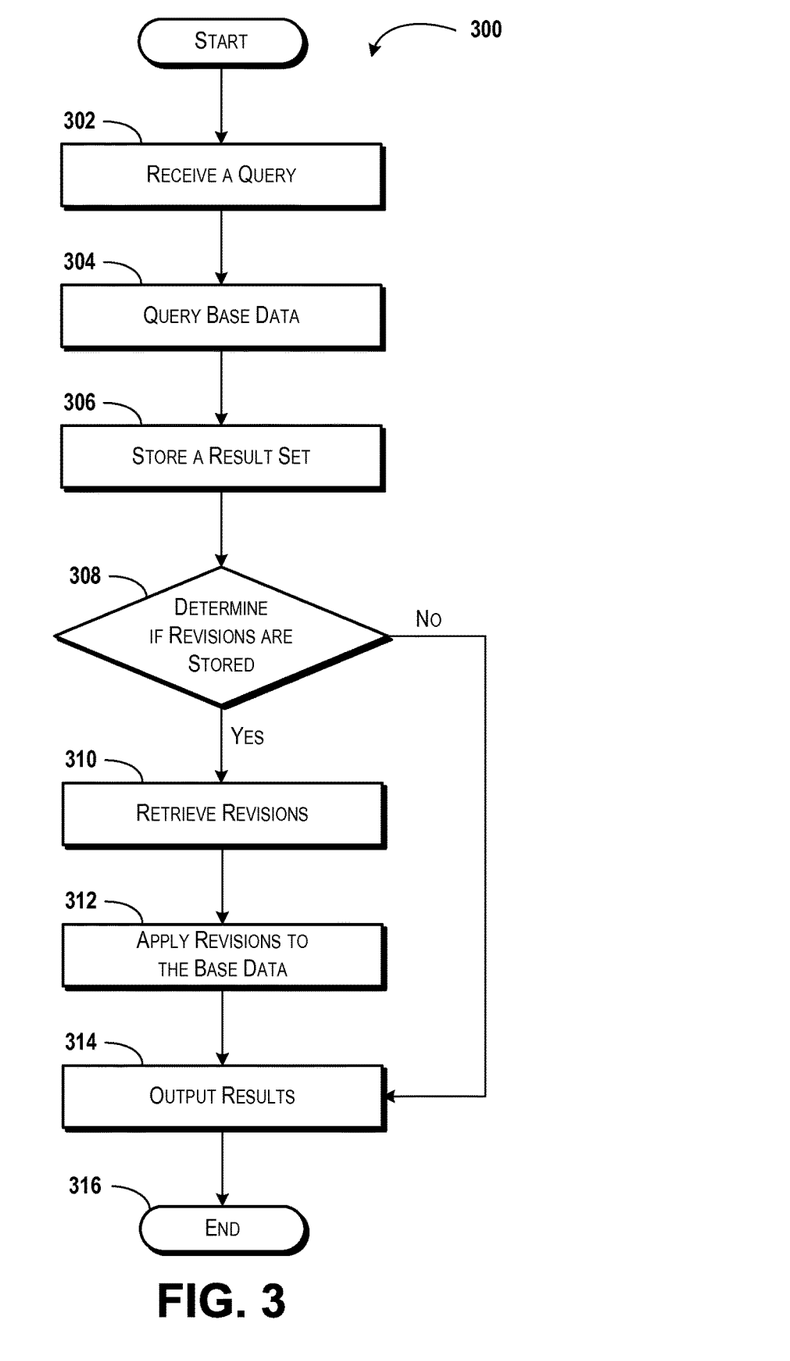
FIG. 3 is a flow diagram showing aspects of a method for responding to a query using data partition revisions, according to another illustrative embodiment.

Turning now to FIG. 3, aspects of a method 300 for responding to a query 126 using data partition revisions 122 will be described in detail, according to an illustrative embodiment. The method 300 begins at operation 302, wherein the server computer 102 receives a query 126. The query 126 received in operation 302 can include a query 126 received from a requestor such as, for example, the user device 124. The query 126 also can correspond to a standing query executed periodically by the server computer 102 and/or one or more reporting devices in communication with the server computer 102. The query 126 received in operation 302 can correspond to a query 126 that is to be executed against the base data 118 stored at the data store 116. As will be explained in more detail below, the server computer 102 can be configured to determine if the query 126 is to be responded to with data obtained from the revision data 120 in addition to, or instead of, the base data 118. Because the query 126 can be executed against other data and/or combinations of the base data 118 and/or the revision data 120, it should be understood that this embodiment is illustrative, and should not be construed as being limiting in any way.

From operation 302, the method 300 proceeds to operation 304, wherein the server computer 102 executes the query 126 against the base data 118. Thus, the server computer 102 can identify one or more values, data points, time stamps, keys, identifiers, records, and/or other information included in the base data 118 that are responsive to the query 126 received in operation 302. It should be understood that although not shown in the FIGURES, the server computer 102 can be configured to generate a call to and/or to execute one or more query applications for executing the query 126. As such, operation 304 can include, in some embodiments, invoking functionality associated with a query application via an internal program call and/or via an application programming interface ("API") exposed by a query application or query device.

From operation 304, the method 300 proceeds to operation 306, wherein the server computer 102 stores a result set resulting from execution of the query 126 against the base data 118 in operation 304. Thus, operation 306 can include generation and/or storage of a result set. The server computer 102 can be configured to store the result set by persisting or otherwise storing the result set in a memory, in a cache, and/or in other data storage devices or locations, if desired. A result set generated in operation 306 and/or other results of the query 126 executed in operation 304 may be used to apply revisions 122 to generate a set of results 128, as will be explained in more detail below.

From operation 306, the method 300 proceeds to operation 308, wherein the server computer 102 determines if one or more revisions 122 are stored at the data store 116. In particular, the server computer 102 can determine, in operation 308, if one or more revisions 122 stored at the data store 116 are relevant to the data included in the result set identified as satisfying the query 126 in operation 304. According to various embodiments, the revisions 122 can include a key or identifier such as, for example, a string, a GUID, and/or other identifiers that can be used to identify corresponding data included in the base data 118. As such, the server computer 102 can be configured to determine that one or more revisions 122 are relevant to the base data 118 by searching for matching GUIDs and/or other keys or identifiers among the revisions 122, or the like. Because the server computer 102 can be configured to identify revisions 122 in additional and/or alternative ways, it should be understood that this embodiment is illustrative, and should not be construed as being limiting in any way.

If the server computer 102 determines, in operation 308, that one or more revisions 122 associated with the result set identified in operation 304 are stored in the revision data 120, the method 300 proceeds to operation 310. In operation 310, the server computer 102 retrieves the revisions 122 determined to be stored in operation 308. As noted above, the server computer 102 can identify the revisions 122 by using a key, GUID, or other identifier of the revision 122. Thus, the server computer 102 can execute, for example, a "get" command in operation 310 for obtaining the revisions 122 having the identifier used to identify the revisions 122 in operation 308. Because the revisions 122 can be identified and retrieved in additional and/or alternative ways, it should be understood that this embodiment is illustrative, and should not be construed as being limiting in any way.

From operation 310, the method 300 proceeds to operation 312, wherein the server computer 102 applies the revisions 122 retrieved in operation 310 to the result set of the base data 118 identified in operation 304. As explained above with reference to FIG. 1, the revisions 122 can include, but are not limited to, a delta and a timestamp. In applying a revision 122 to the base data 118, which can be identified by a key, GUID, or other identifier, the server computer 102 can combine the delta of the applied revision 122 with a data point of the base data 118 to which the delta is applied to generate an updated base data table or partition, which can correspond to an updated version of the base data 118. The server computer 102 also can replace a time stamp of the base data 118 with a time stamp of the applied revision 122. Thus, after applying a revision 122 to the base data 118, the data point of the base data 118 can reflect the applied delta and the time stamp of the base data 118 can be the same as the applied revision 122. It should be understood that this embodiment is illustrative, and should not be construed as being limiting in any way.

As explained above with reference to operation 306, the server computer 102 can store the result set determined in operation 304. As such, in operation 312, the server computer 102 can apply each of the revisions retrieved in operation 310 to the base data 118 included in the result set stored in operation 306. As such, the base data 118 may be updated multiple times if multiple revisions are identified in operation 310. Thus, although not explicitly illustrated in FIG. 3, operation 312 can be iterated for any number of identified revisions 122.

From operation 312, the method 300 proceeds to operation 314. The method 300 also can proceed to operation 314 from operation 308, if the server computer 102 determines that revisions 122 are not stored at the data store 116. In operation 314, the server computer 102 outputs results 128. The results 128 output by the server computer 102 in operation 314 can correspond to the result set determined in operation 304, if no revisions 122 are stored. If revisions 122 are stored, the results 128 output in operation 314 can correspond to the result set stored in operation 306, wherein data of the result set can be modified by the deltas of corresponding revisions 122 retrieved in operation 310.

From operation 314, the method 300 proceeds to operation 316. The method 300 ends at operation 316.

It can be appreciated that by executing the method 300 described above, some embodiments of the server computer 102 can be configured to provide up-to-date results 128. These results 128 can be generated by the server computer 102 even though the updates may not be applied to the base data 118. These updates can be stored as revisions 122 that can be maintained by the server computer 102 for various amounts of time and/or operations until a trigger is detected by the server computer 102. When the server computer 102 detects a trigger event, the server computer 102 can, by execution of the data management application 108, merge multiple revisions 122 to form a merged revision 122, and apply the merged revisions 122 to the base data 118. Thus, the base data 118 can be updated to reflect multiple revisions 122 during execution of a single revision merging process. An example of the merging of revisions 122 is illustrated and described below with reference to FIG. 4. By merging and applying multiple revisions 122 during one process, some embodiments of the concepts and technologies disclosed herein can further enhance utilization and/or performance associated with the server computer 102 by reducing a number of updates and/or save operations. These and other aspects of a method for applying merged revisions 122 to base data 118 are described in additional detail below.

Figure 4:
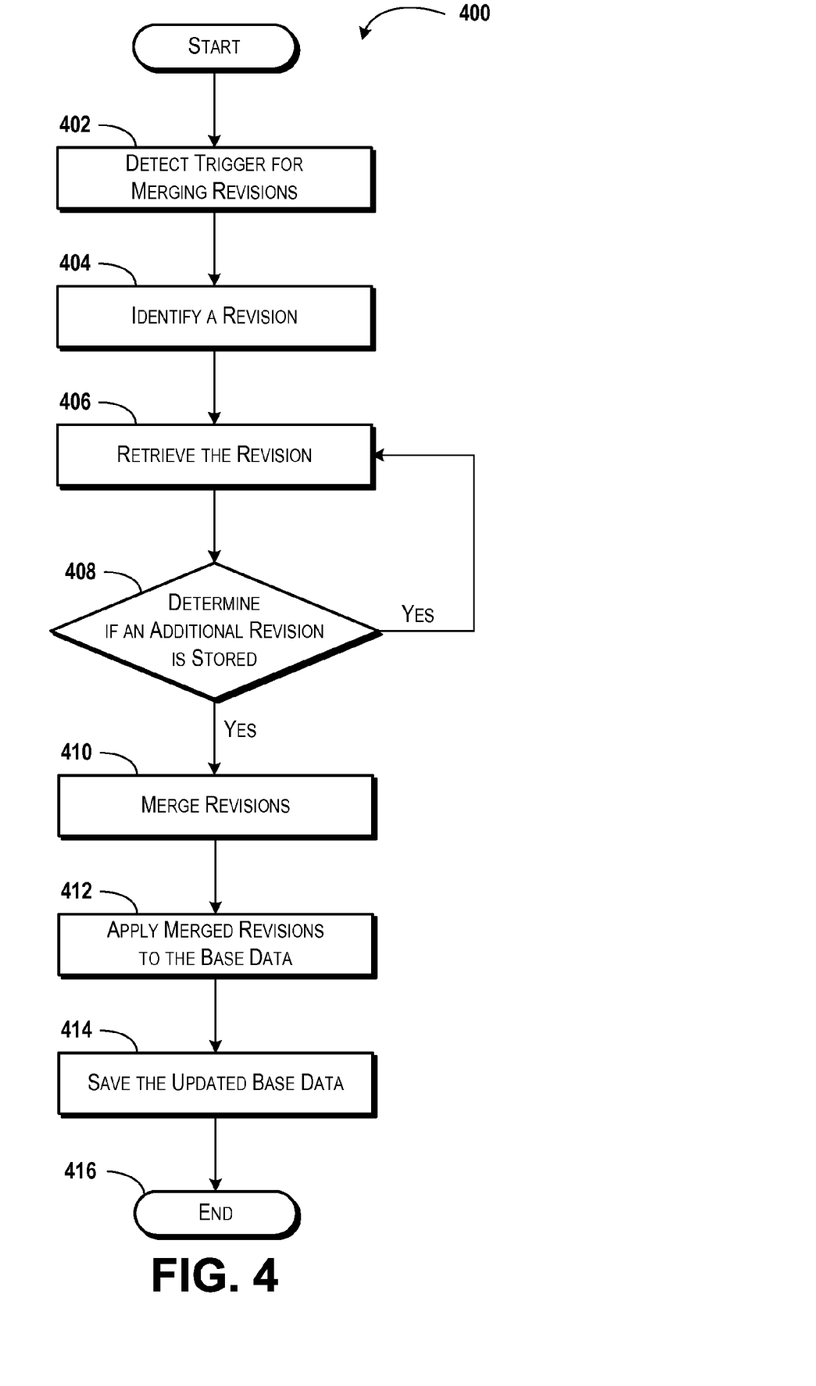
FIG. 4 is a flow diagram showing aspects of a method for applying merged partition revisions to base data, according to another illustrative embodiment.

Turning now to FIG. 4, aspects of a method 400 for applying merged partition revisions to base data will be described in detail, according to an illustrative embodiment. The method 400 begins at operation 402, wherein the server computer 102 detects a trigger for revision merging. According to various embodiments of the concepts and technologies disclosed herein, the server computer 102 can be configured to merge revisions 122 based upon various trigger events such as, for example, passage of a particular amount of time, execution of a number of queries 126 or other actions, storage of a particular number of revisions 122, receiving a command to merge revisions 122, detecting expiration of a timer that can be initiated with each revision merging operation, combinations thereof, or the like. While the merging of revisions 122 can be completed for various reasons, it should be understood that in some embodiments, the revisions 122 can be merged with each other and/or the base data 118 to generate an updated version of the base data 118. It should be understood that this example is illustrative, and should not be construed as being limiting in any way.

The numbers of operations and/or the particular amounts of time that may be used to trigger merging of revisions 122 can be options or configuration settings that may be determined various authorized entities including, but not limited to, operators and/or customers associated with the server computer 102. Because revision merging can be triggered by any number of operations, it should be understood that the above examples of triggering merging of the revisions 122 are illustrative, and should not be construed as being limiting in any way.

From operation 402, the method 400 proceeds to operation 404, wherein the server computer 102 identifies a revision 122. The server computer 102 can identify a particular revision 122 by identifying a revision 122 associated with the base data 118, by randomly selecting a revision 122, and/or in other ways. In some embodiments, the server computer 102 selects a revision in operation 404 by identifying an oldest time stamp among multiple revisions 122 and selecting the revisions 118 with the oldest time stamp. Based upon a key, GUID, or other identifier in the base data 118, the server computer 102 can select a related revision 122. Because a revision 122 can be selected in other ways, it should be understood that these embodiments are illustrative, and should not be construed as being limiting in any way.

From operation 404, the method 400 proceeds to operation 406, wherein the server computer 102 retrieves the revision 122 identified in operation 404. In some embodiments, the server computer 102 can execute a "get" command to obtain the revision 122, though the revision 122 can be retrieved in additional and/or alternative ways.

From operation 406, the method 400 proceeds to operation 408, wherein the server computer 102 determines if an additional revision 122 is stored. In some embodiments, two or more revisions 122 can be stored in the revision data 120. The two or more revisions 122 can correspond to two or more updates to the base data 118. As such, the server computer 102 can determine, in operation 408, if another revision 122 relating to the revision 122 retrieved in operation 408 exists in the data store 116.

If the server computer 102 determines, in operation 408, that an additional revision 122 is stored, the method 400 can return to operation 406 and the server computer 102 can retrieve another (related) revision 122. Because almost any number of revisions 122 can be stored at the data store 116, depending upon settings and/or limitations associated with the data store 116, operations 406-408 can be iterated almost any number of times. By iterating operations 406-408, the server computer 102 can retrieve any number of related revisions 122.

From operation 408, the method 400 proceeds to operation 410, wherein the server computer 102 merges the revisions 122 retrieved in operations 406-408. To merge the revisions 122, the server computer 102 can combine the deltas of respective revisions 122. The server computer 102 also can identify the most recent timestamp among the revisions to serve as a new time stamp for the merged revisions. Three example revisions "Rev1," "Rev2," and "Rev3" and their respective delta and timestamp values are presented below in TABLE 1.

TABLE 1

| Revision Name | Delta | Timestamp |
| --- | --- | --- |
| Rev1 | +2 | 08-28-2014 08:44:15 AM |
| Rev2 | −5 | 08-28-2014 08:49:37 AM |
| Rev3 | +7 | 08-28-2014 08:53:29 AM |

In merging the example revisions 122 shown in TABLE 1, the server computer 102 can merge the delta values, +2, −5, and +7 to obtain a merged delta value of +4. In some embodiments, the server computer 102 can merge the revisions 122 from oldest revision 122 to most recent revision 122, an order that can be based upon the timestamp values, if desired. In merging the revisions 122, the server computer 102 also can select the most recent timestamp value and use that value as the timestamp of the merged revisions 122. Thus, in merging the above example revisions 122, the server computer 102 can generate a merged revision having a value of +4 and a timestamp of Aug. 28, 2014 at 8:53:29 AM. Thus, the server computer 102 can be configured to determine, based upon the example revisions 122 shown in TABLE 1, that as of Aug. 28, 2014 at 8:53:29 AM, the delta of the revisions 122 corresponds to a net change of +4. Because the illustrated revisions 122 are illustrative, this example should not be construed as being limiting in any way.

From operation 410, the method 400 proceeds to operation 412, wherein the server computer 102 can apply the merged revision 122 generated in operation 410 to the base data 118 associated with the revisions 122. As explained above, revisions 122 can be associated with the base data 118 by way of a key, GUID, or other identifier. Thus, operation 412 can include the server computer 102 identifying the base data 118 associated with the merged revision 122 generated in operation 410 as well as applying the merged revision 122 with the base data 118. The application of the merged revision 122 to the base data 118 can be similar, in some embodiments, to the merging of revisions 122 as described with reference to operation 410. Thus, a data point of the base data 118 can be combined with the delta of the merged revision 122, and the timestamp of the base data 118 can be replaced with the timestamp of the merged revision 122. In operation 412, the server computer 102 can generate an updated base data table or partition, also referred to herein as an updated version of the base data 118.

From operation 412, the method 400 proceeds to operation 414, wherein the server computer 102 saves the updated base data 118. According to various embodiments, the server computer 102 can save the updated base data 118, thereby replacing the base data 118 to which the revisions 122 have been applied with the updated base data 118 that reflects the applied merged revisions 122. Although not shown in FIG. 4, it should be understood that the server computer 102 also can delete the old version of the base data 118 and/or the revisions 122 retrieved in operations 406-408 from the revision data 120. Thus, after merging and applying revisions 122 to the base data 118, the server computer 102 can be configured to delete the merged revisions 122 and replace the base data 118 with the updated based data 118.

From operation 414, the method 400 proceeds to operation 416. The method 400 ends at operation 416.

Figure 5:
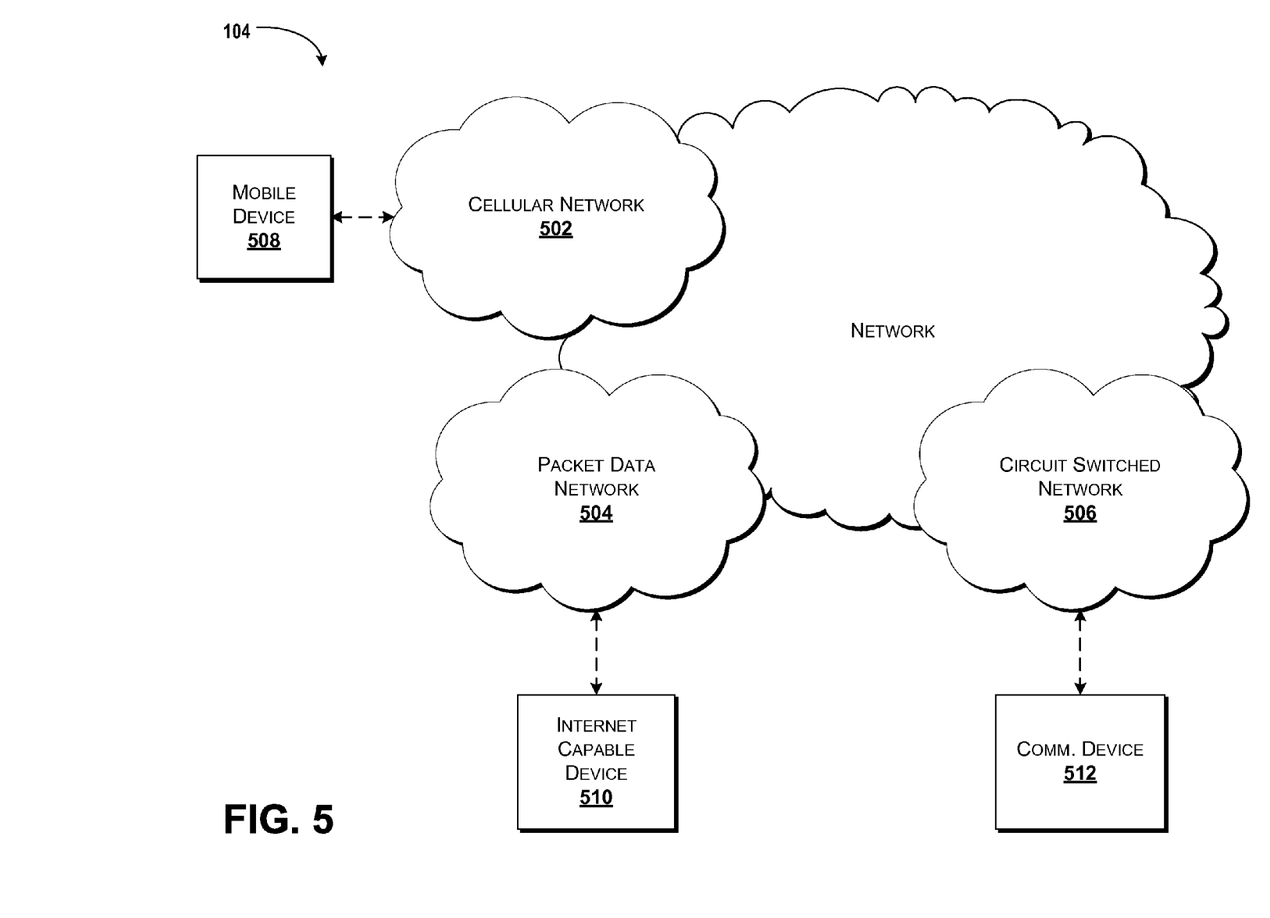
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
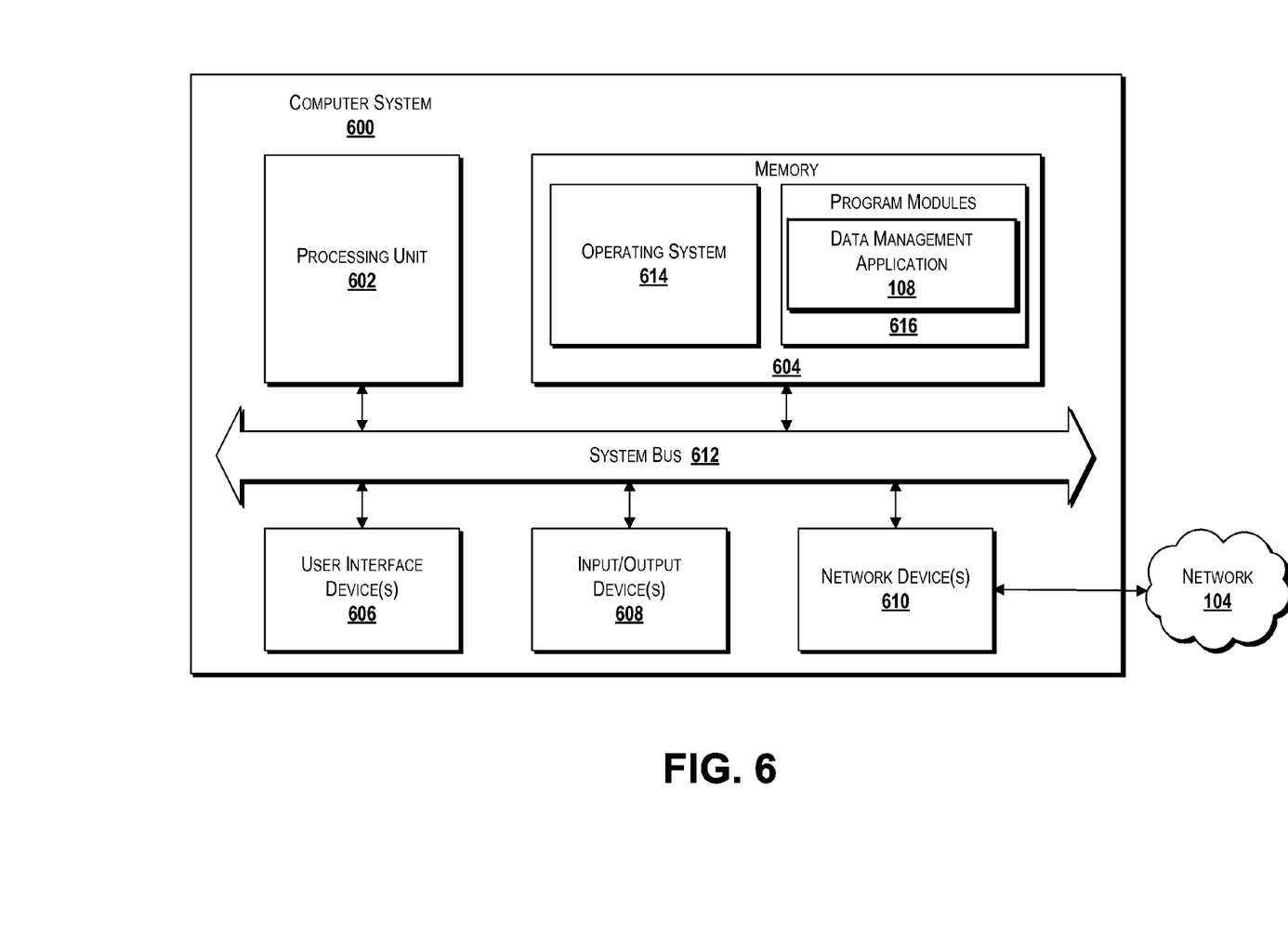
FIG. 6 is a block diagram illustrating an example computer system configured to generate and use temporal data partition revisions, according to some illustrative embodiments.

FIG. 6 is a block diagram illustrating a computer system 600 configured to provide the functionality described herein generating and using temporal data partition revisions, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the data management application 108. This and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store data from one or more of the data streams 110, the base data 118, the revision data 120, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for generating and using temporal data partition revisions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    obtaining, at a server computer that executes a data management application, a data partition included in a data stream that is generated by a data source and streamed by the data source, the data partition comprising a single temporal release of a portion of a data table, wherein the portion of the data table is released multiple times over multiple temporal releases, and wherein the data partition comprises a record comprising a data point and a timestamp that indicates a time at which the data point was generated by the data source;
    analyzing, by the server computer, contents of the data partition, a header associated with the data partition, and base data stored at a data store to determine whether the data partition corresponds to a new partition or an update of a base data partition stored at the data store, the base data partition comprising a base data point and a base data timestamp associated with the base data;
    if a determination is made that the data partition corresponds to the new partition, storing, by the server computer, the new partition as part of the base data at the data store;
    if a determination is made that the data partition corresponds to the update, computing, by the server computer, a revision comprising
        a revision identifier associated with the revision,
        a delta that defines a change made to the base data point by the revision, and
        the timestamp that indicates the time at which the data point was generated by the data source; and
    storing, by the server computer, the revision as revision data that is stored separately from the base data partition.

2. The method of claim 1, wherein the base data partition stores a base data identifier, and wherein the revision identifier and the base data identifier are the same.

3. The method of claim 1, wherein the data partition comprises a data identifier, wherein the base data partition stores a base data identifier, and wherein determining that the data partition corresponds to the update comprises determining that the data identifier is the same as the base data identifier.

4. The method of claim 1, further comprising:
receiving a query;
executing the query against the base data; and
storing a result set comprising results of the query against the base data, the result set comprising the base data partition.

5. The method of claim 4, further comprising:
determining that the revision is stored;
retrieving the revision;
applying the revision to the base data partition to generate an updated version of the base data partition; and
outputting a result comprising the updated version of the base data partition.

6. The method of claim 1, further comprising:
retrieving two revisions, each revision of the two revisions comprising an update to a data point of the base data partition;
determining, for the two revisions, a most recent timestamp;
merging the two revisions to generate a merged revision comprising a combined update to a value of the data point; and
storing the merged revision with the updated data point value and the most recent timestamp.

7. The method of claim 6, wherein retrieving the two revisions comprises identifying a base data identifier associated with the base data, and retrieving each of the two revisions based upon determining that each of the two revisions comprises the revision identifier that is the same as the base data identifier.

8. The method of claim 1, wherein determining whether the data partition corresponds to the new partition further comprises:
analyzing data point values associated with contents of the data partition; and
determining, based on the analyzing, if the data partition is related to the base data.

9. The method of claim 4, wherein the query comprises a standing query that is executed periodically by the server computer against the base data.

10. A system comprising:
a processor; and
a memory that stores computer-executable instructions that, when executed by the processor, cause the processor to perform operations comprising
obtaining a data partition included in a data stream that is generated by a data source and streamed by the data source, the data partition comprising a single temporal release of a portion of a data table, wherein the portion of the data table is released multiple times over multiple temporal releases, and wherein the data partition comprises a record comprising a data point and a timestamp that indicates a time at which the data point was generated by the data source,
analyzing contents of the data partition, a header associated with the data partition, and base data stored at a data store to determine whether the data partition corresponds to a new partition or an update of a base data partition stored at the data store, the base data partition comprising a base data point and a base data timestamp associated with the base data,
if a determination is made that the data partition corresponds to the new partition, storing the new partition as part of the base data at the data store,
if a determination is made that the data partition corresponds to the update, computing a revision comprising
a revision identifier associated with the revision,
a delta that defines a change made to the base data point by the revision, and
the timestamp that indicates the time at which the data point was generated by the data source, and
storing the revision as revision data that is stored separately separate from the base data partition.

11. The system of claim 10, wherein the computer-executable instructions, when executed by the processor, cause the processor to perform operations further comprising:
receiving a query;
executing the query against the base data; and
storing a result set comprising results of the query against the base data, the result set comprising the base data partition.

12. The system of claim 11, wherein the computer-executable instructions, when executed by the processor, cause the processor to perform operations further comprising:
determining that the revision is stored;
retrieving the revision;
applying the revision to the base data partition to generate an updated base data partition; and
outputting a result comprising the updated base data partition.

13. The system of claim 10, wherein the computer-executable instructions, when executed by the processor, cause the processor to perform operations further comprising:
retrieving two revisions, each revision of the two revisions comprising an update to a data point of the base data partition;
determining, for the two revisions, a most recent timestamp;
merging the two revisions to generate a merged revision comprising a combined update to a value of the data point; and
storing the merged revision with the updated data point value and the most recent timestamp.

14. The system of claim 10, wherein determining whether the data partition corresponds to the new partition further comprises:
analyzing data point values associated with contents of the data partition; and
determining, based on the analyzing, if the data partition is related to the base data.

15. A computer storage medium having computer-executable instructions stored thereon that, when executed by a processor, cause the processor to perform operations comprising:
obtaining a data partition included in a data stream that is generated by a data source and streamed by the data source, the data partition comprising a single temporal release of a portion of a data table, wherein the portion of the data table is released multiple times over multiple temporal releases, and wherein the data partition comprises a record comprising a data point and a timestamp that indicates a time at which the data point was generated by the data source;

analyzing contents of the data partition, a header associated with the data partition, and base data stored at a data store to determine whether the data partition corresponds to a new partition or an update of a base data partition stored at the data store, the base data partition comprising a base data point and a base data timestamp associated with the base data;

if a determination is made that the data partition corresponds to the new partition, storing the new partition as part of the base data at the data store;

if a determination is made that the data partition corresponds to the update, computing a revision comprising
 a revision identifier associated with the revision,
 a delta that defines a change made to the base data point by the revision, and
 the timestamp that indicates the time at which the data point was generated by the data source; and storing the revision as revision data that is stored separately from the base data partition.

16. The computer storage medium of claim 15, wherein the computer-executable instructions, when executed by the processor, cause the processor to perform operations further comprising:

retrieving two revisions, each revision of the two revisions comprising an update to a data point of the base data partition;

determining, for the two revisions, a most recent timestamp;

merging the two revisions to generate a merged revision comprising a combined update to a value of the data point;

storing the merged revision with the updated data point value and the most recent timestamp.

17. The computer storage medium of claim 15, wherein the computer-executable instructions, when executed by the processor, cause the processor to perform operations further comprising:

receiving a query;

executing the query against the base data; and storing a result set comprising results of the query against the base data, the result set comprising the base data partition.

18. The computer storage medium of claim 17, wherein the computer-executable instructions, when executed by the processor, cause the processor to perform operations further comprising:

determining that the revision is stored;

retrieving the revision;

applying the revision to the base data partition to generate an updated base data partition; and outputting a result comprising the updated base data partition.

19. The computer storage medium of claim 15, wherein determining whether the data partition corresponds to the new partition further comprises:

analyzing data point values associated with contents of the data partition; and determining, based on the analyzing, if the data partition is related to the base data.

\* \* \* \* \*